United States Patent
Caplan

[19]

[11] Patent Number: 5,899,616
[45] Date of Patent: May 4, 1999

[54] IMPACT ABSORBING KEYBOARD, CONTOURED TO THE NATURAL SHAPE OF THE HAND AND METHOD OF USING

[76] Inventor: Leslie S. Caplan, 37 Prosper St., San Francisco, Calif. 94114

[21] Appl. No.: 08/957,964

[22] Filed: Oct. 21, 1997

[51] Int. Cl.[6] ........................................................ B41J 5/00
[52] U.S. Cl. .......................... 400/489; 400/491; 400/715; 400/488
[58] Field of Search ..................... 400/490, 489, 400/488, 491, 491.3, 495.1, 714, 715; 150/154, 165; 200/302.2, 512; 206/320

[56] References Cited

U.S. PATENT DOCUMENTS

| | | | |
|---|---|---|---|
| 726,107 | 4/1903 | Stanton .................................... | 400/490 |
| 832,617 | 10/1906 | Munson et al. .......................... | 400/491 |
| 1,203,570 | 11/1916 | Beaubien ................................. | 400/491 |
| 2,102,526 | 12/1937 | Guilfoyle ................................. | 197/100 |
| 2,181,955 | 12/1939 | Ward, Jr. ................................. | 197/103 |
| 2,733,804 | 2/1956 | Wesson .................................... | 197/103 |
| 3,848,723 | 11/1974 | Hogue ...................................... | 400/490 |
| 3,929,216 | 12/1975 | Einbinder ................................ | 400/489 |
| 4,042,090 | 8/1977 | Hasebe et al. ........................... | 197/102 |
| 4,501,936 | 2/1985 | Morse ................................... | 200/302.2 |
| 4,734,679 | 3/1988 | Haskins .................................... | 340/365 |
| 4,755,072 | 7/1988 | Hoornweg ............................... | 400/490 |
| 4,974,183 | 11/1990 | Miller ...................................... | 400/489 |
| 5,021,638 | 6/1991 | Nopper et al. ...................... | 235/145 R |
| 5,080,155 | 1/1992 | Crozier ................................. | 200/302.2 |
| 5,145,270 | 9/1992 | Darden .................................... | 400/488 |
| 5,183,346 | 2/1993 | Tesar ....................................... | 400/490 |
| 5,244,296 | 9/1993 | Jensen ..................................... | 400/715 |
| 5,270,507 | 12/1993 | Nakamura et al. ..................... | 200/511 |
| 5,290,115 | 3/1994 | Little ....................................... | 400/491 |
| 5,391,006 | 2/1995 | Danziger ................................. | 400/488 |
| 5,464,292 | 11/1995 | Grant ....................................... | 400/715 |
| 5,490,647 | 2/1996 | Rice ........................................ | 400/715 |
| 5,491,313 | 2/1996 | Bartley et al. .......................... | 200/310 |
| 5,507,458 | 4/1996 | Campbell et al. ...................... | 400/715 |
| 5,560,724 | 10/1996 | Iwasa et al. ............................ | 400/490 |
| 5,582,375 | 12/1996 | Martin .................................. | 248/118.3 |
| 5,610,602 | 3/1997 | Hargreaves .............................. | 341/22 |
| 5,735,619 | 4/1998 | Myint ..................................... | 400/489 |

OTHER PUBLICATIONS

Just Rubber Industry Co., LTD Brochure (from the internet).
"Ergonomic Keyboard Eases Typing Strain", Jeff Angus, *InfoWorld*, Mar. 1, 1993.
"Kinesis' Ergonomic Keyboard Relieves the Strain on Sore Wrists", Abigail Crane, Kinesis Corporation Promotional Brochure, 1995, 1996.

*Primary Examiner*—Edgar Burr
*Assistant Examiner*—Leslie Grohusky
*Attorney, Agent, or Firm*—Staas & Halsey

[57] ABSTRACT

An ergonomic adaptation to a keyboard, including a plurality of pads, or key pillows, preferably formed together into a key pillow tablet. The key pillows either replace or fit over keys of a keyboard to advantageously alter the consistency, texture and/or shape of the traditional keys. In alternative embodiments, each of the key pillows may be formed individually to replace or fit over some or all of the keyboard keys. The key pillow tablet further includes raised pads at the front of the keyboard on which the palms may rest during typing to maintain a satisfactorily low angle of the fingers with respect to the elbow. The adaptation may either be an attachment to a keyboard or may be integrally formed to a keyboard during the keyboard's manufacture.

25 Claims, 3 Drawing Sheets

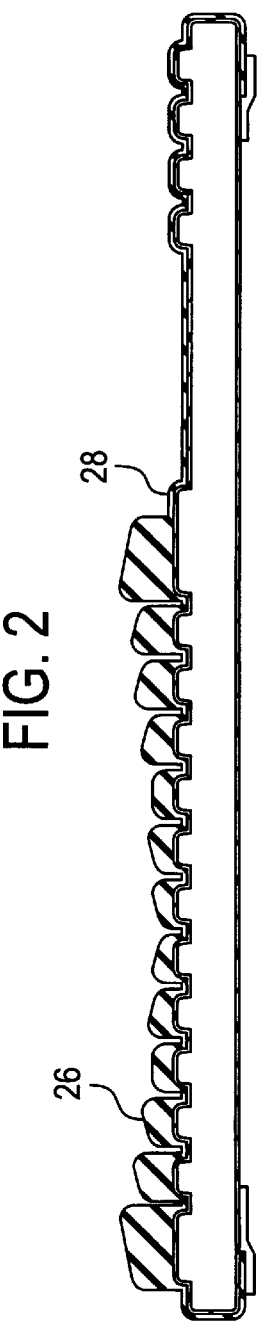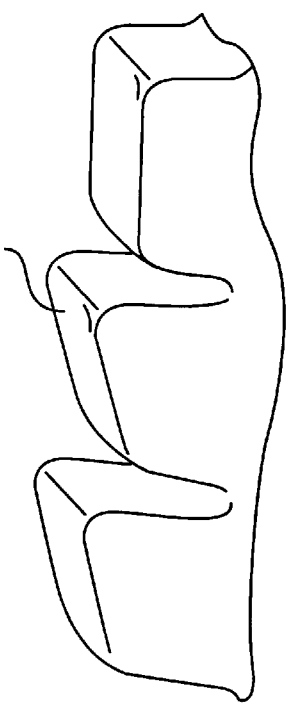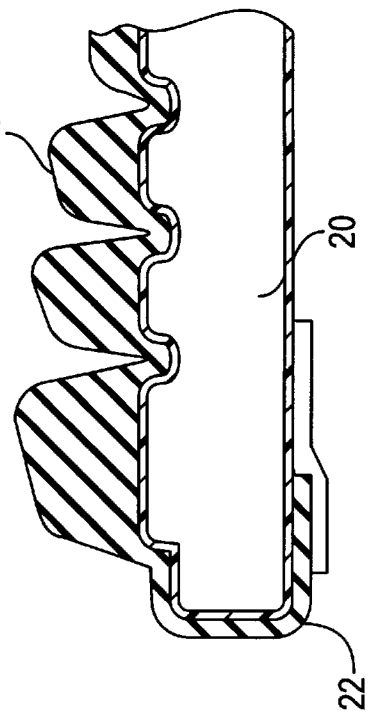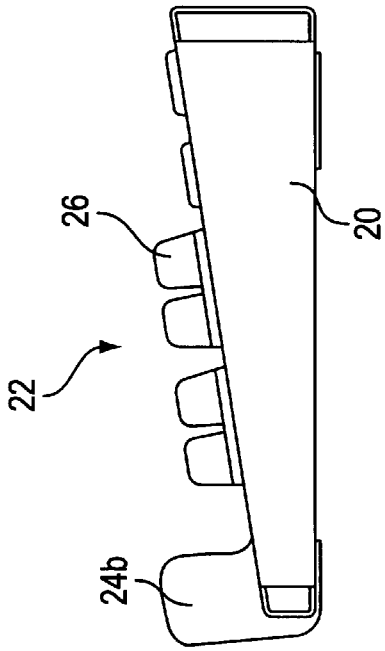

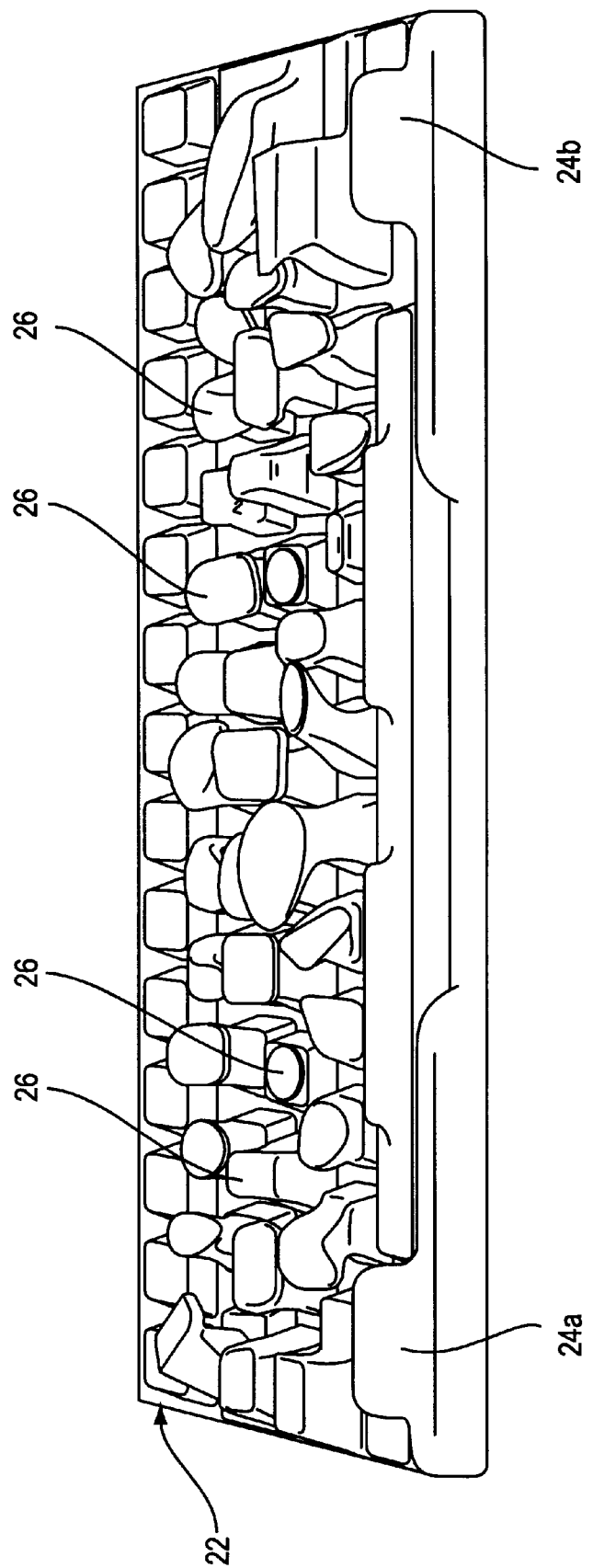

IMPACT ABSORBING KEYBOARD, CONTOURED TO THE NATURAL SHAPE OF THE HAND AND METHOD OF USING

BACKGROUND OF THE INVENTION

1. Field of the Invention

The present invention relates to keyboards, and in particular to an ergonomic keyboard designed to minimize stress and injury related to carpal tunnel syndrome and other repetitive strain injuries.

2. Description of Related Art

Incidents of Repetitive Strain Injuries (RSI), for example Carpal Tunnel Syndrome (CTS), are increasing at an astronomical rate, affecting nearly two million workers annually and costing an estimated $20 billion per year in workers' compensation, medical benefits, and lost wages. RSI to the upper extremities results, in part, from the repetitive reaching, stretching, bending, flexing, and twisting of fingers. Maintaining the wrist in an awkward position during these repetitive motions increases the likelihood of injury. Over time, these awkward repetitive motions can inflame soft tissue, creating pressure on various nerves and causing pain, numbness, and tingling sensations in the upper extremities. Unless treated, RSI may result in pain, numbness, weakness, and loss of dexterity due to pressure on the median nerve.

The group most affected by RSI is keyboard operators such as secretaries, data entry personnel, computer programmers, and journalists. From the standpoint of typing speed, keyboards have advantageously evolved to the point where pauses in typing, formerly required in older model typewriters for carriage returns, paper feeds, and manual error corrections, are no longer required. While disadvantageous from an efficiency standpoint, these typing pauses significantly reduced strain and fatigue on the fingers, wrists, lower arms, upper arms, shoulders, neck, and back. Consequently, this reduced the occurrence of CTS and other repetitive strain injuries.

Despite the increased efficiency of the keyboard, the evolution of the keyboard from an ergonomic and health standpoint has been largely overlooked. With a conventional keyboard, the palms "float" in the air or rest on the desk in front of the keyboard and the wrist and fingers bend upward to depress the keys. Consequently, the muscles and tendons in the lower arm, neck, and shoulders must continually support the fingers at this upward angle to prevent the fingers from inadvertently striking the keys. Maintaining this position while typing for an extended period of time can strain the muscles and tendons of the lower arm, neck, and shoulders and significantly contributes to CTS and other repetitive strain injuries.

Additionally, many keyboards today have a non-linear relationship between the force applied to a key relative to the downward distance a key travels during a key stroke. That is, in order to prevent inadvertent key striking, many keyboards require a relatively large force to initiate a key stroke, but require a relatively small force on the keyboard key for the remainder of the stroke. The result is that often a greater force than necessary is applied to a key during the latter portion of the key stroke, and the abrupt end of the stroke results in an impact or shock on the fingers. While this effect is relatively insignificant in striking a single key, the cumulative effect of these forces and shocks from continuous typing can aggravate nerves and soft tissue in the upper extremities to the point that CTS and other repetitive strain injuries can occur.

SUMMARY OF THE INVENTION

It is therefore an advantage of the present invention to provide an keyboard substantially alleviating many of the causes of CTS and other related repetitive strain injuries.

It is a further advantage of the present invention to provide a keyboard including pads for elevating the palms and preventing an awkward, strained angle between the fingers and lower arm.

It is another advantage of the present invention to provide soft key surfaces to alleviate much of the impact and shock occurring on the fingers at the bottom of a keyboard stroke in conventional keyboards.

It is a still further advantage of the present invention to provide a keyboard with sloped, irregular, non-rectilinear keys designed to minimize the reaching, stretching, and twisting that often result in finger strain.

It is another advantage of the present invention to provide a comfortable, anti-skid key surface to reduce the force required to actuate a key.

It is a further advantage of the present invention to provide a solid, continuous layer over a keyboard to prevent dirt, dust, fluids and other particulates from entering between the keys of the keyboard.

These and other advantages are accomplished by the present invention, which in a preferred embodiment relates an ergonomic adaptation to a conventional keyboard, including a plurality of pads, or key pillows, preferably formed together into a key pillow tablet. The key pillows can replace or fit over the existing keys of a conventional keyboard to advantageously alter the consistency, texture and/or shape of the traditional keys. In alternative embodiments, each of the key pillows may be formed individually to replace or fit over some or all of the keyboard keys. The key pillow tablet further includes raised pads at the front of the keyboard on which the palms may rest during typing to reduce the bend in the wrists, to minimize the angle between the fingertips and the elbow, and to support the weight of the hand and arm.

The key pillows elevate and reshape the keys and space bar of a traditional keyboard to better accommodate the varying lengths of the fingers. For example, the outer keys which are depressed by the shorter pinky and ring fingers are sloped inward to minimize the stretching and twisting traditionally required of those fingers and wrists to strike those keys. Similarly, keys in the back rows may be sloped downward to minimize the reaching, twisting, and stretching of the fingers typically necessary to strike those keys. Further, the space bar may be elevated to reduce the required motion of the wrist and/or thumb in striking that bar. This keeps the keys within a comfort zone of a user. That is, the user has to extend his or her fingers minimally to reach all the keys on the keyboard, thereby reducing the stress on hands, fingers, and the upper extremities of the user, thereby reducing the occurrence of repetitive stress injury.

The surfaces of each key pillow are preferably soft and shock absorbent to reduce shock to the fingers upon a keystroke, and are also preferably textured to reduce slippage and the force required to activate a particular key. Where each key pillow is part of a key pillow tablet, the entire tablet may be formed of a soft, shock absorbent, textured surface, or such soft, shock absorbent, textured surfaces may only be provided on the key pillows of the tablet. Alternatively, the key pillow tablet may be formed of a particular material, and a soft, shock absorbent, textured material may be provided on the top surfaces of the key pillows of the tablet.

The present invention significantly reduces the risk of CTS and other repetitive strain injuries. First, the raised wrist pads support a typist's palms and ensure that the muscle and tendon movement associated with typing does not occur with the wrist bent at an awkward angle. The raised wrist pads also relieve strain and tension in a typist's hands by supporting the weight of the arms and shoulders. This additional support prevents nerve irritation and damage and reduces the risk of tendon and soft tissue inflammation within the wrists and throughout the upper extremities. Second, by varying the elevation and inclination of the key pillows, the typical reaching, twisting, and stretching of the fingers to depress the keys of a conventional keyboard will be minimized, thereby further reducing the strain on the muscles and tendons in the lower arm. Third, by providing the keys with a shock absorbent and textured upper surface, the shock to which the fingers are subjected on each keystroke is reduced, and the force required for striking the keys is also reduced.

BRIEF DESCRIPTION OF THE DRAWINGS

The invention will now be described with reference to the drawings in which:

FIG. 2 is a sectional view through line 2—2 of FIG. 1;

FIG. 2a is a perspective view of the key pillows according to the present invention showing the relative elevation and inclination of individual key pillows FIG. 3 is an end view of the keyboard according to the present invention showing the raised key pillows at one end of the keyboard;

FIG. 4 is an enlargement of an end of the sectional view shown in FIG. 2; and

FIG. 5 is a drawing showing an alternative embodiment of the present invention.

DETAILED DESCRIPTION

Figure 1:
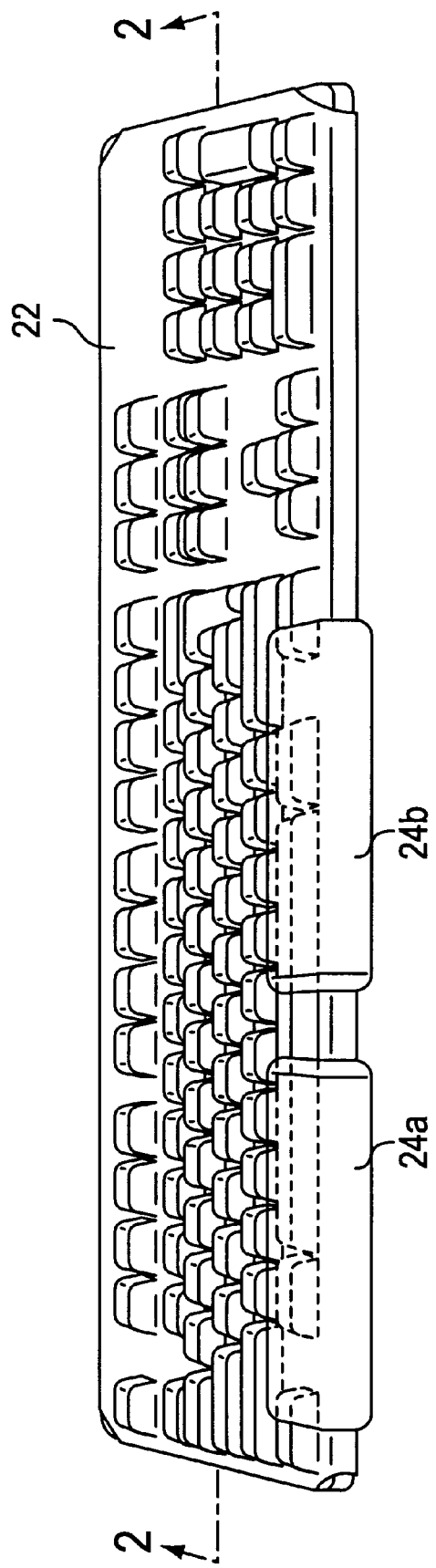
FIG. 1 is a perspective view of the keyboard according to the present invention.

The invention will now be described with reference to FIGS. 1–5 which in general depict a keyboard 20 having a length and width approximating that of a conventional full-sized keyboard (e.g., approximately 20 inches by 8 inches). Other dimensions may be used in alternative embodiments. The keyboard 20 may have a standard or non-standard keyboard layout of alphanumeric keys. The preferred embodiment includes a standard QWERTY layout. Common commercial adaptations of the standard layout include the AT keyboard layout, XT keyboard layout and APPLE MACINTOSH® keyboard layout. Non-standard keyboard layouts include for example splitting the standard layout into two halves, angled with respect to each other, such as for example the Natural Keyboard manufactured by MICROSOFT® Corporation. It is understood that the present invention may be adapted to work with any of the various known keyboards. Additionally, it is contemplated that the present invention may be used on keys of other devices, including but not limited to, musical instruments, cash registers, calculators, adding machines, telephones, laptop computers, notebook computers, and stenographic machines.

Referring now to FIGS. 1–4, there is shown a keyboard 20 including a key pillow tablet 22 affixed thereon. Key pillow tablet 22 includes raised pads 24a and 24b for supporting the palms, and a plurality of key pillows 26 fitting over each of the keys on the keyboard. A base material 28 may surround and attach each of the key pillows 26 and pads 24a and 24b, so that the key pillow tablet 22 forms a continuous cover over the keyboard 20. The tablet may be formed with elastic straps to hold the tablet on the keyboard. Thus, the tablet may be easily removed, cleaned, and replaced. Other known fastening systems may alternatively be used. In a preferred embodiment of the invention, the lower surface of the tablet is formed with negative impressions of the keys of keyboard 20, to enable the tablet to fit over the keyboard keys. The upper surface of the tablet includes the key pillows 26 directly over the keys of the keyboard 20, which key pillows are formed to various heights and inclinations as explained hereinafter.

In a preferred embodiment of the invention, the negative impression for each key on the underside of the tablet is formed such that the tablet extends partially over the keys of the keyboard, i.e., so that the tablet extends partially down along the vertical sides of each key. However, it is understood that the negative impression for each key on the underside of the tablet may be formed to a depth so that the tablet fits substantially entirely over the keys of keyboard 20. Moreover, in a further embodiment of the invention, the bottom surface of tablet 22 may be substantially flat, without any impressions. In this embodiment, the tablet may simply lie on top of each of the keys of keyboard 20. This latter embodiment may additionally have small brackets formed on the underside of the tablet, which brackets entirely or partially surround each key of the keyboard to assist in keeping the key pillows 26 aligned over their respective keys. Alternatively, this latter embodiment may be secured to the respective keys of keyboard 20 by an adhesive.

The tablet has thus far been described as fitting over keys of a conventional keyboard. However, in a further embodiment of the invention, the keys of keyboard 20 may be omitted. In this embodiment, a tablet with a negative impression for each post on the underside of the tablet may be formed to a depth so that the tablet may be fitted directly over the posts on which the keys are mounted in conventional keyboards. In any of the above-described keyboard and tablet embodiments, the tablet may simply rest over or on top of the keys or posts of the keyboard. Alternatively, an adhesive may be applied to the underside of the tablet so that the tablet is fixedly held in place over or on top of the keys or posts of the keyboard.

In a preferred embodiment, each of the key pillows 26 may be formed of a soft, shock absorbent material, such as, for example, silicone, rubber, latex, urethane, foam, molded and filled spandex, or any combination of these materials. It is understood that the key pillows 26 may be formed of other materials in alternative embodiments of the invention. As explained in the Background of the Invention section, due in part to the larger force required to initiate a key stroke as compared to the remainder of the stroke, a greater force is applied downward on the keys by the fingers than the upward force of the keys during the latter portion of a keystroke. This results in an impact or shock to the fingers at the bottom of each key stroke. The shock absorbent material from which the key pillows 26 are formed can greatly reduce the shock received by the fingers upon initially impacting the key, and upon the key reaching the bottom of a key stroke.

Dirt, dust, liquids, or other particulates may fall between keys in conventional keyboards. The particulates may cause the keys to stick, requiring an even greater force to free and depress the keys and resulting in even greater shock to the fingers. According to one embodiment of the present invention, the tablet 22 covering the entire keyboard prevents particulates from passing between the keys into the keyboard. Among other advantages, such a system ensures that the tablet surface can be easily cleaned, the keys do not stick, and reduces the shock to the fingers otherwise occurring upon actuation of a stuck key.

The upper surfaces of key pillows 26 are preferably textured to reduce the likelihood of a finger slipping on a key, and to reduce the force necessary to depress a key. As would be appreciated by those skilled in the art, the key pillows may be textured in various configurations, including, for example, nubs, ridges, fine bristles, or the character(s) appearing on the key being raised relative to the key surface. In a preferred embodiment, a representative outline of the alphanumeric character or function associated with a particular key may be indicated on the upper surface of the key pillow located thereon. The upper surface of the key pads may additionally or alternatively be covered with or made of a slip-resistant material. That is, the coefficient of friction of the keyboard or attachment according to the present invention is greater than on a standard computer keyboard.

As previously indicated, the height and angle of inclination of key pillows 26 on top of keyboard 20 may vary with respect to each other. In one embodiment, the key pillows in the first and second rows (i.e., the rows starting with "1" and "q", respectively) of a conventional QWERTY keyboard served by the pinky and ring finger (i.e., "q" or "2" or "p" or "9") may be raised relative to keys in those rows served by the remaining fingers. The key pillows in the first and second rows served by the pinky and ring fingers may additionally or alternatively have upper surfaces that are angled inward toward the center of the row. These keys may additionally or alternatively have upper surfaces angled downward toward the home row (i.e., the row beginning with "a") so as to physically position the keys closer to the shorter pinky and ring fingers. In a preferred embodiment of the invention, the key pillows in the first and second rows served by, and farthest from, the pinky and ring finger may include the greatest angle of inclination inward toward the center and/or downward toward the home row. Providing these key pillows with a greater elevation and inclination, relative to the surrounding key pillows, makes it easier to strike these keys by minimizing the repetitive stretching, twisting, and reaching of the shorter pinky and ring fingers. This, in turn, reduces the strain experienced by muscles and tendons in the lower arm, neck, and shoulder while typing.

In a preferred embodiment, the upper surfaces of the remaining key pillows in the first and second rows may also be angled downward toward the home row. Moreover, the key pillow covering the space bar may include one or more elevated sections, against which the thumb may strike. By providing one or more raised surfaces over the space bar, the amount by which the hand must rotate and/or the amount by which the thumb must extend to depress the space bar is reduced. Again, inclining and/or elevating the upper surfaces of the above described key pillows makes it easier to depress these keys by minimizing the repetitive stretching, twisting, and reaching of the fingers. This, in turn, reduces the strain experienced by muscles and tendons in the lower arm, neck, and shoulder while typing. Although a preferred embodiment includes key pillows with elevated and inclined upper surfaces, it is contemplated that the key pillows have even and substantially parallel upper surfaces, used in conjunction with other inventive features of the present invention, in alternative embodiments. Additionally, it is contemplated that each key have the same shape, contour and inclination in an alternative embodiment of the invention.

The present invention further includes raised pads 24a and 24b. The pads are preferably formed integrally on tablet 22, but may alternatively be affixed to tablet 22 after formation thereof. The pads 24a and 24b are preferably slightly deformable so that the palms may rest comfortably thereon, and may be formed of the same or different material as tablet 22. In a preferred embodiment, the pads may have a height of approximately 0.5 inches to approximately 2 inches, and optimally about 1 inch to about 1.5 inches. The heights of the pads 24a and 24b vary, in the preferred embodiment from one end thereof to another. These heights may vary in alternative embodiments of the invention. Alternatively, the pads may be uniform in height. Although a preferred embodiment of the invention includes two pads, it is understood that there may be one long pad along the front of keyboard 20, or a pad comprised of several segments. The pads function to elevate a typist's palms relative to the fingers to prevent the wrist from being bent at an awkward angle during typing. The pads additionally support the weight of a typist's hands, arms, and shoulders, thereby reducing strain at the Brachial Plexus. As indicated in the Background of the Invention section, extended typing with the wrists bent at an awkward angle is a significant contributor to CTS and other repetitive strain injuries. Additionally, extended typing with the hands and wrists supporting the full weight of the arms and shoulders can contribute to Nerve Entrapment and Thoracic Outlet Syndrome. Although a preferred embodiment includes pads 24a and 24b, it is contemplated that the pads may be omitted from the invention in alternative embodiments.

The invention has thus far been described as an attachment to a keyboard including a plurality of key pillows 26 and pads 24a and 24b provided on a tablet 22 to form a continuous sheet over the keyboard. However, in an alternative embodiment of the present invention, instead of forming a continuous tablet, each of the key pillows may be independent pieces, which may be added to select keys on keyboard 20 as desired. In this embodiment, each individual key pillow may include a lower surface having a negative impression fitting partially or completely over select keys, and maintained thereon by a pressure contact between the key pillow and key or by an adhesive. Alternatively, the individual key pillows may have a flat lower surface, and may be affixed to select keys by an adhesive. As a further alternative, selected keyboard keys may be omitted or removed, and the individual key pillows mounted over the key posts protruding from the keyboard. The individual key pillows according to this embodiment may be formed with the same materials, textures, elevations, and inclinations as the key pillows described above as part of tablet 22.

In the embodiment described in the preceding paragraph, the pads 24a and 24b may be affixed to the front edge of the keyboard by a pressure fit, an adhesive, or both.

As an alternative embodiment, the keyboard may be formed as a tablet 22 shown in FIG. 5. The key pillows 26 are formed thereon and replace the keys of the keyboard 20. As shown in this drawing, the palm rests 24a and 24b are integral with the tablet 22, which acts as the keyboard 20.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

I claim:

1. A method for using an attachment for a keyboard having a plurality of keys, said attachment comprising a plurality of key pillows attached to one another to form a tablet, said method comprising the steps of:

provid ing said attachment in the form of a tablet and including said plurality of key pillows having irregular, non-rectilinear, shapes, said key pillows having varying heights and shapes to extend said key pillows into a comfort zone of a user;

positioning said tablet on said keyboard so that said plurality of key pillows aligns with said plurality of keys, said key pillows fitting over said keys, said keys and said key pillows having a one-to-one correspondence; and attaching said tablet to said keyboard so that by depressing one of the plurality of key pillows, the corresponding one of the plurality of keys is also depressed, whereby said key pillows allow said depressing thereof by the fingers of the user so as to minimize reaching and twisting that cause repetitive stress injury.

2. A method for using a keyboard having a plurality of keys, said keyboard including a plurality of soft key pillows formed on the plurality of keys, said method comprising the steps of:

providing said keyboard including said plurality of key pillows of irregular, non-rectilinear shapes, said key pillows having varying heights and shapes to extend said key pillows into a comfort zone of a user;

positioning said plurality of key pillows on said keyboard so that said plurality of key pillows aligns with said plurality of keys, said keys and said key pillows having a one-to-one correspondence; and depressing one of the plurality of key pillows, and thus depressing the corresponding one of the plurality of keys, whereby said key pillows allow said depressing thereof by the fingers of the user so as to minimize reaching and twisting that cause repetitive stress injury.

3. An attachment for a keyboard, said keyboard including a plurality of keys, said attachment comprising:

key pillows of irregular, non-rectilinear shapes which attach to the keys of the keyboard, said key pillows have varying heights and shares to extend said key pillows into a comfort zone of a user;

wherein said key pillows allow a user to strike the keys by depressing the corresponding one of said key pillows;

said key pillows extend the upper, lower and outer keys into the comfort zone where the user can reach the respective key pillow, thereby reducing twisting and reaching required of the user's fingers, hands, wrists, and upper extremities, said comfort zone being an area accessible by natural movement of the fingers; and said attachment may maintain a conventional horizontal position of the hands, and accommodates the hands by making the keys more easily reached based on individual and varying limits of the fingers.

4. An attachment for a keyboard as claimed in claim 3, further comprising a raised palm rest for resting a palm of the user thereon.

5. An attachment for a keyboard as claimed in claim 3, wherein said attachment is formed as a tablet, wherein all the key pillows are attached together.

6. An attachment for a keyboard as claimed in claim 3, wherein said key pillows are formed of a soft, shock absorbent material selected from the group consisting of silicone, rubber, latex, urethane, foam, molded and filled spandex, and combinations thereof.

7. An attachment for a keyboard as claimed in claim 3, wherein said key pillows have a higher coefficient of friction than a normal keyboard.

8. A keyboard, said keyboard including a plurality of keys, said keyboard comprising:

soft key pillows of irregular, non-rectilinear shapes which act as the keys of the keyboard, said key pillows having varying heights and shapes to extend said key pillows into a comfort zone of a user; and palm rests connected to said keyboard for resting the palms of the user thereon so as to maintain the user's wrists in a comfortable, straight position to avoid nerve tension created by resting directly on the wrists that could otherwise contribute to repetitive stress injury, wherein said key pillows allow the user to strike said keys by depressing the corresponding key pillow.

9. A keyboard as claimed in claim 8, wherein said keys are connected together, thereby forming a tablet.

10. A keyboard as claimed in claim 8, wherein said key pillows are formed of a soft, shock absorbent material selected from the group consisting of silicone, rubber, latex, urethane, foam, molded and filled spandex, and combinations thereof.

11. A keyboard as claimed in claim 8, wherein said key pillows have a higher coefficient of friction than a normal keyboard.

12. A keyboard as claimed in claim 8, wherein said palm rests are detachably connected to said keyboard.

13. A plurality of soft key pillows of irregular non-rectilinear shapes formed as keys of a keyboard, said key pillows being formed of a relatively soft shock absorbent material, the softness of said key pillows effectively reducing stress on hands, wrists, fingers, and upper extremities of a user to thereby possibly reduce the chances of developing repetitive stress injury, said key pillows having varying heights and shapes to extend the said key pillows into a comfort zone of the user.

14. A keyboard as claimed in claim 13, further comprising a raised palm rest for resting a palm of the user thereon.

15. A keyboard as claimed in claim 13, wherein said keys are connected together, thereby forming a tablet.

16. A keyboard as claimed in claim 13, wherein said soft, shock absorbent material is selected from the group consisting of silicone, rubber, latex, urethane, foam, molded and filled spandex, and combinations thereof.

17. An attachment for a keyboard as claimed in 13, wherein said key pillows have a higher coefficient of friction than a normal keyboard.

18. A keyboard, said keyboard including a plurality of keys, said keyboard comprising:

key pillows of irregular, non-rectilinear shapes which replace the keys of the keyboard, said key pillows having varying heights and shapes to extend said key pillows into a comfort zone of a user;

wherein said key pillows allow the user to strike said keys by depressing the corresponding key pillow;

said key pillows extend upper, lower and outer keys into the comfort zone where the user can reach the key pillow, thereby reducing twisting and reaching required of the user's fingers, said comfort zone being an area accessible by natural movement of the fingers; and said keyboard may maintain a conventional horizontal position of the hands, and accommodates the hands by making the keys more easily reached based on individual and varying limits of the fingers.

19. A keyboard as claimed in claim 18, further comprising a raised palm rest for resting a palm of the user thereon.

20. A keyboard as claimed in claim 18, wherein said keys are connected together, thereby forming a tablet.

21. A keyboard as claimed in claim 18, wherein said key pillows have a higher coefficient of friction than a normal keyboard.

22. An attachment for a keyboard, said keyboard including a plurality of keys, said attachment comprising:

soft key pillows of irregular, non-rectilinear shapes which attach to the keys of the keyboard, said key pillows having varying heights and shapes to extend said key pillows into a comfort zone of a user;

palm rests connected to said keyboard for resting the palms of the user thereon so as to remove tension from nerves that otherwise could cause repetitive stress injury, wherein said key pillows allow the user to strike the keys by depressing the corresponding key pillow;

said key pillows and said palm rests reduce tension in hands, fingers, wrists, and arms of the user so as to reduce the occurrence of repetitive stress injury.

23. An attachment for a keyboard as claimed in 22, wherein said attachment is formed as a tablet, wherein all the key pillows are attached together.

24. An attachment for a keyboard as claimed in claim 22, wherein said key pillows are formed of a soft, shock absorbent material selected from the group consisting of silicone, rubber, latex, urethane, foam, molded and filled spandex, and combinations thereof.

25. An attachment for a keyboard as claimed in claim 22, wherein said key pillows have a higher coefficient of friction than a normal keyboard.

* * * * *